United States Patent [19]

Green

[11] 4,244,475
[45] Jan. 13, 1981

[54] FISH SORTER

[75] Inventor: John R. Green, West Vancouver, Canada

[73] Assignee: Neptune Dynamics Ltd., North Vancouver, Canada

[21] Appl. No.: 900,745

[22] Filed: Apr. 27, 1978

[30] Foreign Application Priority Data

Feb. 22, 1978 [CA] Canada .................................. 297479

[51] Int. Cl.³ ............................................ B07C 5/342
[52] U.S. Cl. .................................... 209/588; 209/654; 209/912
[58] Field of Search ............... 209/576, 577, 588, 606, 209/616, 651, 652, 654, 912

[56] References Cited

U.S. PATENT DOCUMENTS

| | | | |
|---|---|---|---|
| 1,846,808 | 2/1932 | Hohn et al. ....................... | 209/652 X |
| 2,285,955 | 6/1942 | Wayland ............................. | 209/654 |
| 3,091,333 | 5/1963 | Blake ................................. | 209/652 X |
| 3,812,349 | 5/1974 | Gugliotta et al. ................ | 209/579 X |
| 3,859,522 | 1/1975 | Cuthbert ........................... | 209/588 X |
| 4,051,952 | 10/1977 | Hauptmann et al. ............. | 209/558 X |

FOREIGN PATENT DOCUMENTS 90487  9/1957  Norway .................................... 209/588

*Primary Examiner*—Joseph J. Rolla
*Attorney, Agent, or Firm*—Robert W. Beach; Ward Brown

[57] ABSTRACT

A conveyor transports fish along a path past a fish sex detector. A rotating fish-engaging member is mounted downstream of the detector above the path. According to the sex of a fish as detected by the detector, the rotating fish-engaging member is either shifted downward to kick the fish off the conveyor or held away from the conveyor out of engagement with the fish so that it continues to be transported downstream by the conveyor.

20 Claims, 5 Drawing Figures

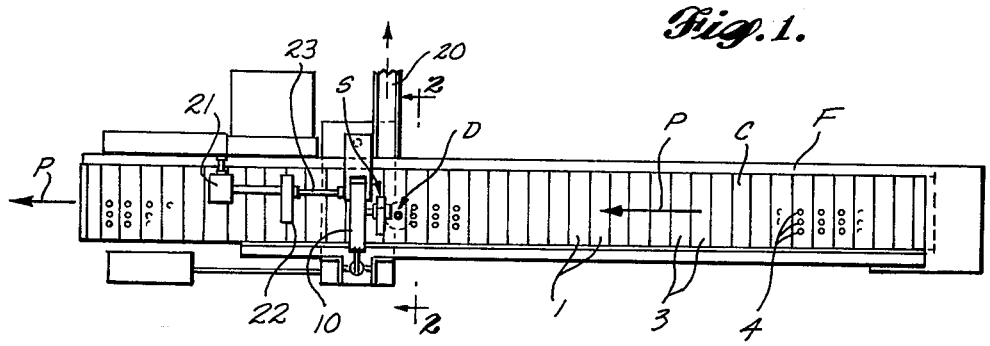
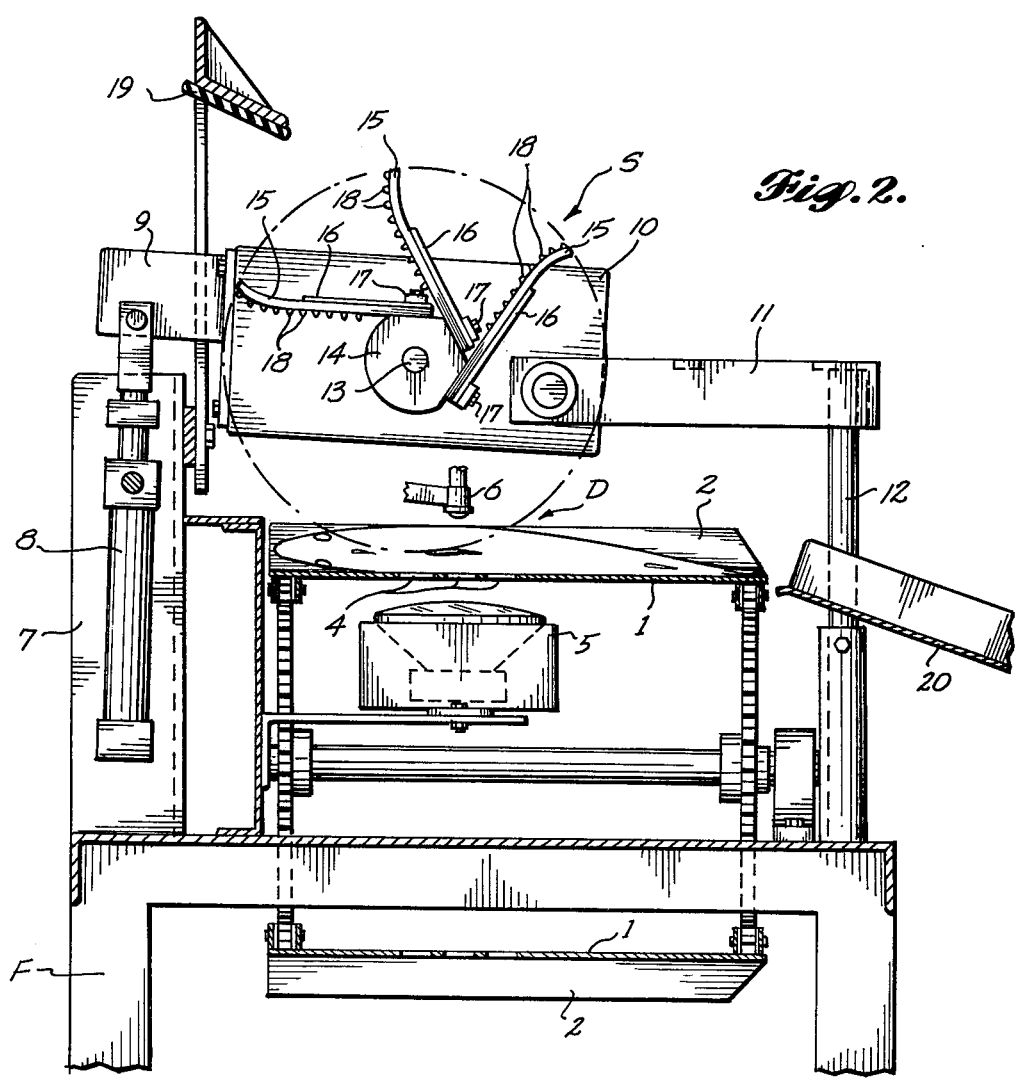

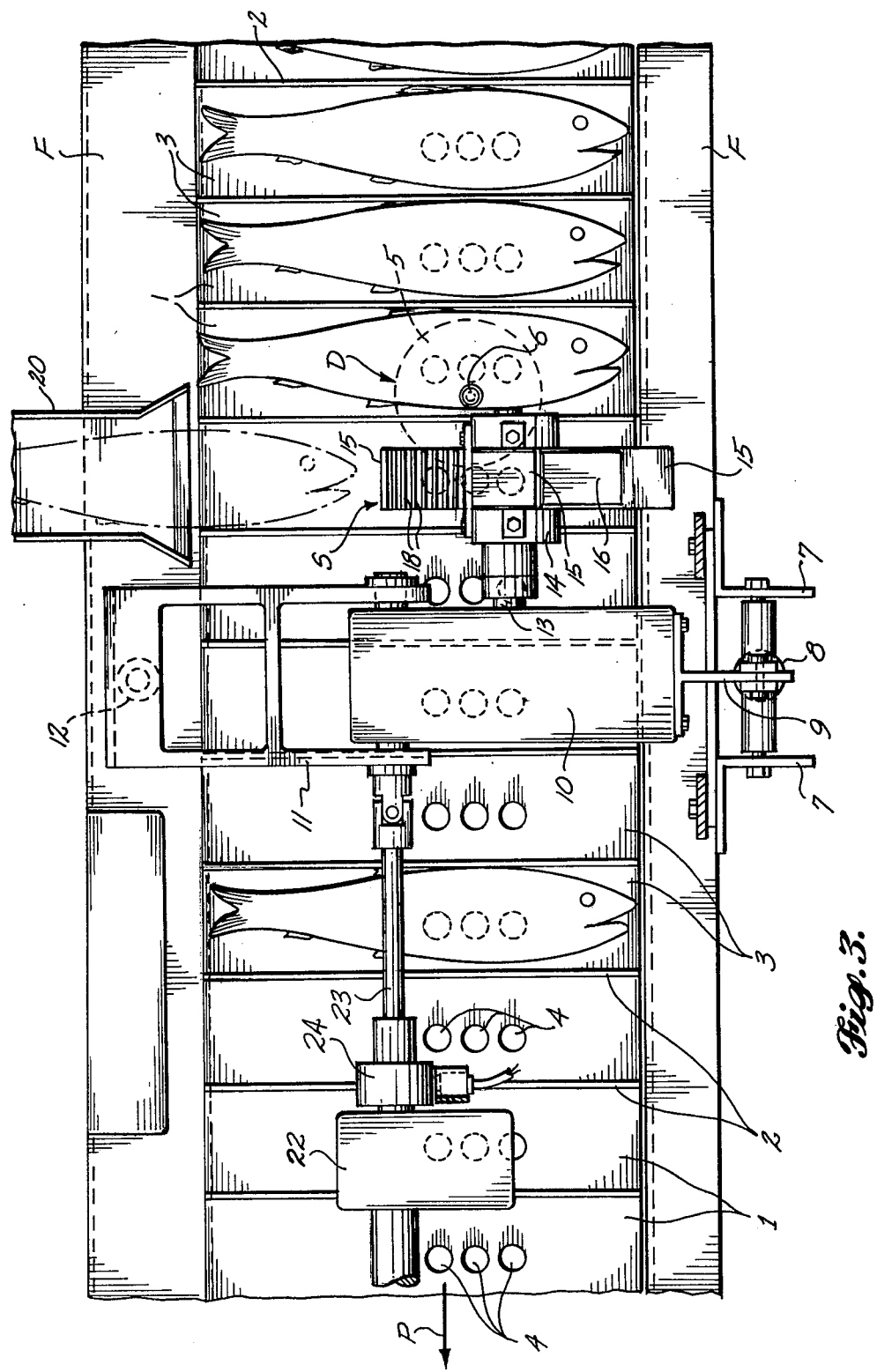

U.S. Patent    Jan. 13, 1981    Sheet 3 of 3    4,244,475
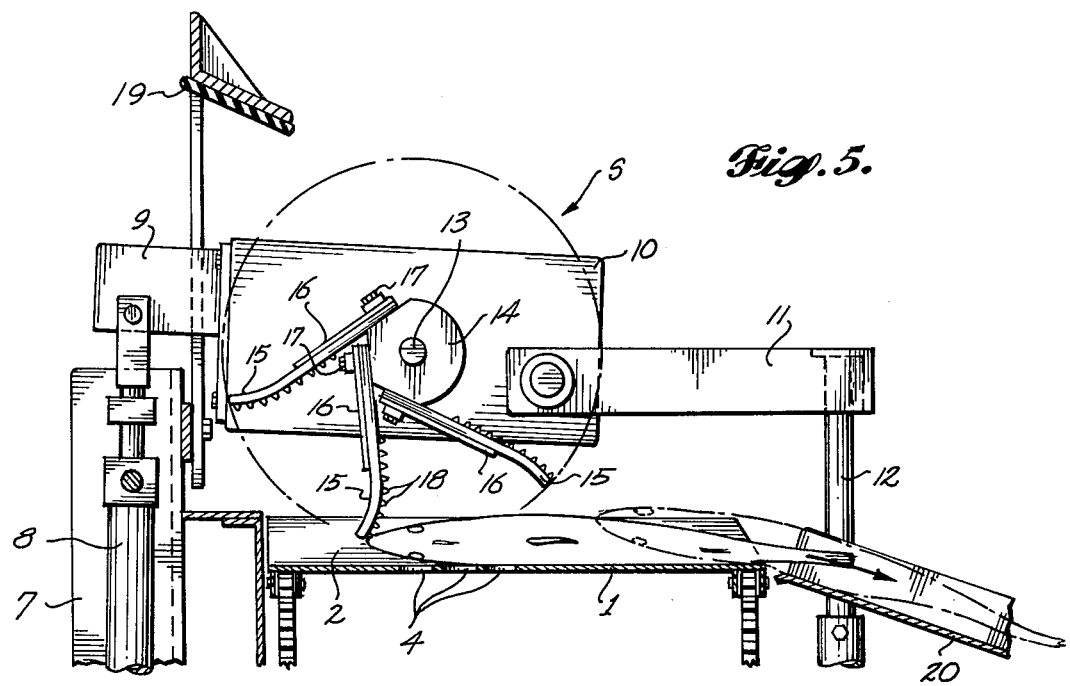
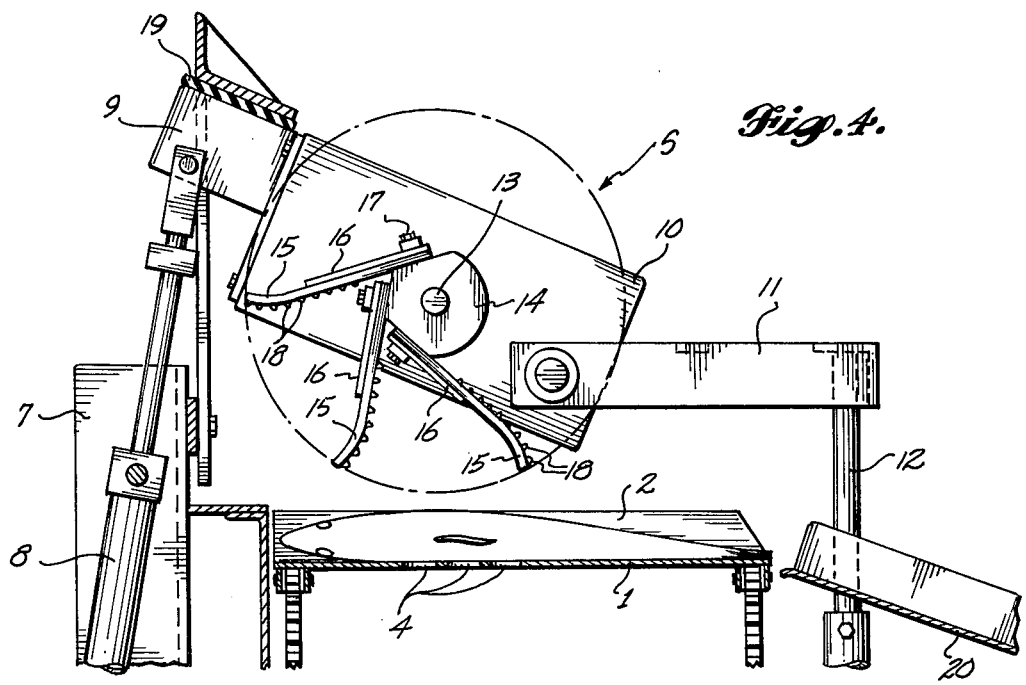

FISH SORTER

BACKGROUND OF THE INVENTION

1. Field of the Invention

The present invention relates to mechanism for sorting fish, particularly for sorting fish according to sex.

2. Prior Art

It is known that the sex of a fish of certain species can be detected without slicing open the fish by beaming radiant energy onto the fish belly and guaging the intensity of such energy transmitted through or reflected by the fish belly. For example, the belly of a roe-carrying herring is much more transparent than the belly of a herring not carrying roe. Consequently, by beaming radiant energy onto one side of the belly of a herring and by measuring the intensity of the radiant energy at the opposite side of the herring belly, it can be determined whether the herring is male or female.

Cuthbert U.S. Pat. No. 3,859,522 discloses a fish sorter using a radiant energy source and energy-responsive sensors for detecting the sex of a fish. However, this patent does not disclose any specific mechanism for actually sorting the fish in accordance with the energy intensity measured by the sensor.

Norwegian Pat. No. 90,487 discloses another fish sorter having a sex detector including a radiant energy source and an energy-responsive sensor. In accordance with this patent, fish are transported past the detector by a conveyor, and the detector signals a gate or gates for diverting the fish according to sex as they drop from the discharge end of the conveyor. If the conveyor of this patent were run at high speed, fish or different weights would be thrown to different locations and the fish sorter would not sort fish effectively. In addition, since there is a time delay from the time of sex detection and the time of fish discharge from the conveyor, the control mechanism for the diverting gates is complicated.

Hauptmann U.S. et al Pat. No. 4,051,952 discloses yet another fish sorter using a radiant energy source and energy-responsive sensors. However, the apparatus of this patent utilizes a different type of sorting mechanism than the sorter of the present invention.

SUMMARY OF THE INVENTION

The principal object of the present invention is to provide an improved fish sorter for sorting fish automatically in accordance with a characteristic detected by a detector, which sorter is of simple and inexpensive, yet rugged, construction and will operate effectively at high speed.

The foregoing object can be accomplished by providing a fish sorter including a detector for detecting a desired characteristic of fish, mechanism for transporting the fish along a path past the detector and a rotating fish-engaging member mounted adjacent to the path of fish movement and shiftable automatically in response to action of the detector from a normal position removed from the path to a position where the member engages fish in the path having the desired characteristic and moves them out of such path.

In the preferred embodiment of the invention, the fish-engaging member includes a somewhat flexible paddle mounted above the path of fish movement and continuously rotated about an axis extending generally parallel to the path. The control mechanism selectively swings the rotating paddle downward toward the path of fish movement to engage the head of a fish having the desired characteristic and kick such fish tailfirst generally transversely out of the conveyor path onto a discharge chute. For fish not having the desired characteristic, the rotating paddle is held away from the path of fish movement so that such fish are not engaged by the paddle and continue to be transported along the path.

BRIEF DESCRIPTION OF THE DRAWINGS

FIG. 1 is a top plan of the preferred form of fish sorter in accordance with the present invention.

FIG. 2 is a fragmentary vertical transverse section taken on line 2—2 of FIG. 1.

FIG. 3 is a top plan of the fish sorter of FIG. 1 with parts broken away.

FIG. 4 is a fragmentary vertical transverse section of the fish sorter of FIG. 1, and FIG. 5 is a corresponding section with parts in different positions.

DETAILED DESCRIPTION

In a fish sorter in accordance with the present invention, a conventional apron conveyor C supported by a suitable frame F and continuously driven at a substantially constant speed by suitable drive mechanism (not shown) transports fish along a path, represented by the arrows P in FIG. 1. The transported fish pass detecting mechanism D for detecting a desired characteristic of each fish and sorting mechanism S for sorting the fish according to the desired characteristic. As best seen in FIGS. 2 and 3, each plate 1 of the conveyor apron includes an upstanding flight 2 so that the array of adjacent plates which make up the upper run of the apron form consecutive fish-receiving buckets or troughs 3. Each of such troughs receives one fish with its length extending transversely of the path of fish movement.

While a fish sorter in accordance with the present invention could be used for sorting fish of any of a variety of species according to any of a variety of characteristics, the preferred form of the invention is incorporated in a herring sex sorter of the type using a radiant energy source and an energy-responsive sensor. Fish are deposited either mechanically or manually in the fish-receiving troughs 3 at the infeed end of the conveyor in the same orientation, that is, with the head of each fish at the same side of the conveyor and the belly of each fish at the same side of each apron plate 1. Further, each plate has apertures 4 at a location corresponding to the location of the belly of the herring carried by the plate.

In accordance with known herring sex sorters, detector D includes a radiant energy source 5 supported from frame F directly below the upper run of the conveyor apron in alignment with apertures 4. An energy-responsive sensor 6 is located above the radiant energy source at the opposite side of the upper run of the apron. As each trough moves past the detector, the source beams radiant energy, preferably infrared energy, trough the plate apertures and through the herring belly. The sex of the fish is detected by the intensity of the radiant energy sensed by the energy-responsive sensor. If such intensity is above a predetermined amount, the herring must be a roe-carrying female.

In accordance with the present invention, sorting mechanism S is provided slightly downstream of the detector. As best seen in FIG. 2, a column 7 extends upward from the conveyor frame and pivotally carries a hydraulic cylinder 8 having a double-acting plunger. The upwardly extending plunger of the cylinder is pivotally connected to a projection 9 of a gearbox 10 located above the conveyor apron. The end portion of the gearbox remote from its projection 9 is pivotally carried for swinging about a horizontal axis by an arm 11 cantilevered from an adjustable height column 12. Such column is carried by the conveyor frame at the opposite side of the apron from column 7.

The output shaft 13 of the gearbox is rotatively driven by power drive mechanism and carries a hub 14 which, in turn, carries a kicker including paddles 15 projecting generally radially outward from shaft 13 and tangentially of hub 14. Each paddle is of somewhat flexible material, such as rubberized fabric, and has its inner end portion clamped to the hub by a backing plate 16 and a bolt 17. The paddles continuously rotate about an axis extending generally parallel to the path of fish movement P, namely the axis of shaft 13. Consequently, each paddle moves continuously in the same general direction relative to path P. The leading face of each paddle has fish-gripping projections in the form of ribs 18 or buttons projecting from it.

For sorting herring according to sex, the plunger of cylinder 8 is triggered in response to a predetermined change in the intensity of energy sensed by the energy-responsive sensor 6. As shown in FIG. 4, the cylinder plunger is normally extended and, consequently, gearbox 10 is normally in its upwardly swung position so that paddles 15 of the kicker will not engage the fish being transported past the detector by the conveyor. A stop 19 for the gearbox projection 9 limits the degree of upward extension of the plunger. As shown in FIG. 5, if the energy intensity sensed by the sensor is above a predetermined amount, indicating that the herring at the detector is a roe-carrying female, the plunger of cylinder 8 is retracted, swinging gearbox 10 downward quickly so that one or more of the paddles slaps the head of the herring and kicks it tailward off the conveyor onto a discharge chute 20. Consequently, as the conveyor continuously transports herring past the detector, each roe-carrying female is engaged by the kicker and moved out of the path of fish movement P.

In the preferred form of the invention shown in the drawings, mechanism is provided to synchronize the operation of the conveyor drive mechanism, the sorter and the detector. As best seen in FIG. 1, the rotating kicker is driven by the same drive mechanism as the conveyor through angle drive 21, reduction gearing 22 and the gearbox 10. The drive shaft 23 extending from reduction gearing 22 to gearbox 10 makes 1 complete revolution, and the kicker shaft 13 makes one complete revolution, each time the conveyor apron moves a distance equal to the distance between the centers of adjacent apron plates 1. The kicker hub 14 is located on shaft 13 such that the center kicker paddle 15 is aligned with the centerline of a plate 1 each time such paddle is at its lowermost position.

As seen in FIG. 3, a rotary switch 24 encircles drive shaft 23. Such switch is activated once during each revolution of such shaft and the moment of activation corresponds to the center of the apertures 4 of an apron plate being directly under sensor 6. Activation of switch 24 signals the sensor to take a reading to measure the radiant energy intensity and to affect actuation of hydraulic cylinder 8 if appropriate. As explained above, if the radiant energy intensity exceeds a predetermined amount, the plunger of hydraulic cylinder 8 is retracted quickly and a paddle 15 will kick a fish off the conveyor.

Since rotation of the kicker and activation of the sensor is synchronized with movement of the conveyor apron, each time the kicker is dropped it is in alignment with an apron plate and the kicker paddles are in position to kick a fish off the conveyor.

If by inadvertence one of the conveyor troughs should be empty, the rotating kicker will be lowered by retraction of the plunger of cylinder 8 caused by radiant energy in excess of a predetermined intensity activating the sensor 6, but no harm is done because there is no fish to be ejected from such empty trough. Naturally, appropriate circuitry could be provided to lower the kicker only if the radiant energy sensed by the sensor was below a predetermined amount, instead of being higher than a predetermined amount, in which case male herring would be kicked off the conveyor and female herring would continue to be transported by the conveyor.

I claim:

1. In a fish sorter including:
   means for detecting a desired characteristic of fish;
   means for transporting the fish along a path past the detecting means;
   fish-engaging means for moving fish out of the path of fish movement;
   means mounting the fish-engaging means adjacent to the path of fish movement for shifting of the fish-engaging means toward and away from such path; and
   control means selectively operable automatically in response to action of the detecting means for shifting the fish-engaging means toward the path of fish movement to engage fish having the desired characteristic and move them out of such path, and for normally maintaining the fish-engaging means away from such path so that fish not having the desired characteristic are not diverted from such path;
   the improvement comprising:
   the fish-engaging means including a central portion and at least one fish-engageable member projecting outward from said central portion, and drive means for moving the fish-engaging means unidirectionally relative to the path of fish movement and including means for synchronizing movement of the fish-engaging means with movement of the transporting means such that a fish-engageable member of the fish-engaging means projects from said fish-engaging means central portion toward the path of fish movement when a fish having the desired characteristic is in registration with the fish-engaging means, said fish-engageable member including a paddle for engaging fish having the desired characteristic.

2. In the fish sorter defined in claim 1, the drive means rotating the fish-engaging means about an axis extending generally parallel to the path of fish movement.

3. In a fish sorter including:
   means for detecting a desired characteristic of fish;
   means for transporting the fish along a path past the detecting means;
   fish-engaging means for moving fish out of the path of fish movement;
   means mounting the fish-engaging means adjacent to the path of fish movement for shifting of the fish-engaging means toward and away from such path; and control means selectively operable automatically in response to action of the detecting means for shifting the fish-engaging means toward the path of fish movement to engage fish having the desired characteristic and move them out of such path, and for normally maintaining the fish-engaging means out of such path so that fish not having the desired characteristic are not diverted from such path;

the improvement comprising drive means rotating the fish-engaging means about an axis extending generally parallel to the path along which fish are moved by the transporting means.

4. In the fish sorter defined in claim 3, the fish-engaging means including a central portion and said paddle central portion and a fish-engageable member projecting outward from said central portion for engaging the head of a fish having the desired characteristic and for kicking such fish tailfirst out of the path of fish movement generally transversely of the path.

5. In the fish sorter defined in claim 1, the paddle being flexible.

6. In the fish sorter defined in claim 4 or 1, the leading face of the paddle having fish-gripping projections.

7. In the fish sorter defined in claim 4 or 1, the paddle projecting generally radially from the axis of rotation of the fish-engaging means.

8. In a fish sorter including:
means for detecting a desired characteristic of fish;
means for transporting the fish along a path past the detecting means;
first-engaging means for moving fish out of the path of fish movement;
means mounting the fish-engaging means adjacent to the path of fish movement for shifting of the fish-engaging means toward and away from such path; and
control means selectively operable automatically in response to action of the detecting means for shifting the fish-engaging means toward the path of fish movement to engage fish having the desired characteristic and move them out of such path, and for normally maintaining the fish-engaging means away from such path so that fish not having the desired characteristic are not diverted from such path;
the improvement comprising the transporting means transporting the fish with their lengths extending transversely of the path of fish movement, the fish-engaging means including a kicker for engaging the head of a fish having the desired characteristic and for kicking such fish tailfirst out of the path generally transversely of the path.

9. In the fish sorter defined in claim 8, drive means for moving the fish-engaging means substantially continuously generally unidirectionally relative to the path of fish movement.

10. In the fish sorter defined in claim 9, the drive means rotating the fish-engaging means.

11. In the fish sorter defined in claim 10, the fish-engaging means including a paddle projecting generally radially from the axis of rotation of the fish-engaging means.

12. In the fish sorter defined in claim 1, 2, 3, 8, 9 or 10, means for synchronizing operation of the control means with movement of the transporting means.

13. In the fish sorter defined in claim 8, 9 or 10, the fish-engaging means including a paddle for engaging fish having the desired characteristic.

14. In the fish sorter defined in claim 13, the paddle being flexible.

15. In the fish sorter defined in claim 13, the leading face of the paddle having fish-gripping projections.

16. The process of sorting fish according to a desired characteristic which comprises:
transporting the fish along a path past mechanism for detecting the desired characteristic and past a fish-engaging mechanism;
rotating the fish-engaging mechanism about an axis extending generally parallel to the path of fish movement;
normally maintaining the fish-engaging mechanism out of such transporting path and out of engagement with the transported fish; and
selectively shifting the fish-engaging mechanism automatically toward such transporting path to engage fish having the desired characteristic as detected by the detecting mechanism to move such fish out of such path.

17. The process defined in claim 16, including moving fish having the desired characteristic as detected by the detecting mechanism generally transversely tailfirst out of the path of first movement by selectively swinging the rotating fish-engaging mechanism toward the path to engage such fish.

18. The process of sorting fish according to a desired characteristic which comprises:
transporting the fish transversely of their lengths along a path past mechanism for detecting the desired characteristic and past a fish-engaging mechanism;
substantially continuously moving the fish-engaging mechanism generally unidirectionally relative to the path of fish movement;
normally maintaining the fish-engaging mechanism out of such transporting path and out of engagement with the transported fish; and
moving fish having the desired characteristic as detected by the detecting mechanism fish tailfirst out of such transporting path generally transversely of such path by selectively shifting the fish-engaging mechanism automatically toward such transporting path to engage such fish.

19. The process defined in claim 16, 17 or 18, including rotating fish-engaging mechanism having a central portion and at least one fish-engageable member projecting from such central portion at a speed controlled by the speed of movement of the fish past the fish-engaging mechanism such that a fish-engageable member of the fish-engaging mechanism projects from the fish-engageable member central portion generally toward the transporting path when a fish having the desired characteristic is registered with the fish-engaging mechanism.

20. The process of sorting fish according to a desired characteristic which comprises:
transporting the fish along a path past mechanism for detecting the desired characteristic and past a fish-engaging mechanism having a central portion and at least one fish-engageable paddle projecting outward from such central portion;
moving the fish-engaging mechanism unidirectionally relative to the path in synchronism with the movement of the fish past the fish-engaging mechanism such that a fish-engageable paddle of the fish-engaging mechanism projects from the fish-engaging mechanism central portion toward the path when a fish having the desired characteristic is in registration with the fish-engaging mechanism;

normally maintaining the fish-engaging mechanism out of such transporting path and out of engagement with the transported fish; and selectively shifting the fish-engaging mechanism automatically toward such transporting path to engage fish having the desired characteristic as detected by the detecting mechanism to move such fish out of such path.

* * * * *

UNITED STATES PATENT AND TRADEMARK OFFICE
CERTIFICATE OF CORRECTION

PATENT NO. : 4,244,475
DATED : January 13, 1981
INVENTOR(S) : John R. Green

It is certified that error appears in the above-identified patent and that said Letters Patent are hereby corrected as shown below:

Column 1, line 40, cancel "U.S. et al" and insert --et al. U.S.--

Column 5, line 22, after "claim 1" insert --2 or 4--; line 24, after "claim" insert --1, 2 or--; same line, cancel "or 1"; line 26, after "claim" insert --1, 2 or--; same line, cancel "or 1"; line 34, cancel "first-engaging" and insert --fish-engaging--.

Column 6, line 27, cancel "first" and insert --fish--.

Signed and Sealed this

Twenty-eighth Day of April 1981

[SEAL]

Attest:

RENE D. TEGTMEYER

Attesting Officer

Acting Commissioner of Patents and Trademarks

UNITED STATES PATENT AND TRADEMARK OFFICE
CERTIFICATE OF CORRECTION

PATENT NO. : 4,244,475
DATED : January 13, 1981
INVENTOR(S) : John R. Green

It is certified that error appears in the above-identified patent and that said Letters Patent are hereby corrected as shown below:

Column 5, line 16, cancel "central portion and said paddle".

Signed and Sealed this

Twenty-eighth Day of July 1981

[SEAL]

Attest:

GERALD J. MOSSINGHOFF

Attesting Officer

Commissioner of Patents and Trademarks